June 4, 1963 A. W. FRANCIS 3,092,570
REMOVAL OF AROMATIC HYDROCARBONS FROM JET FUEL MIXTURES
Filed Aug. 1, 1960 3 Sheets-Sheet 1
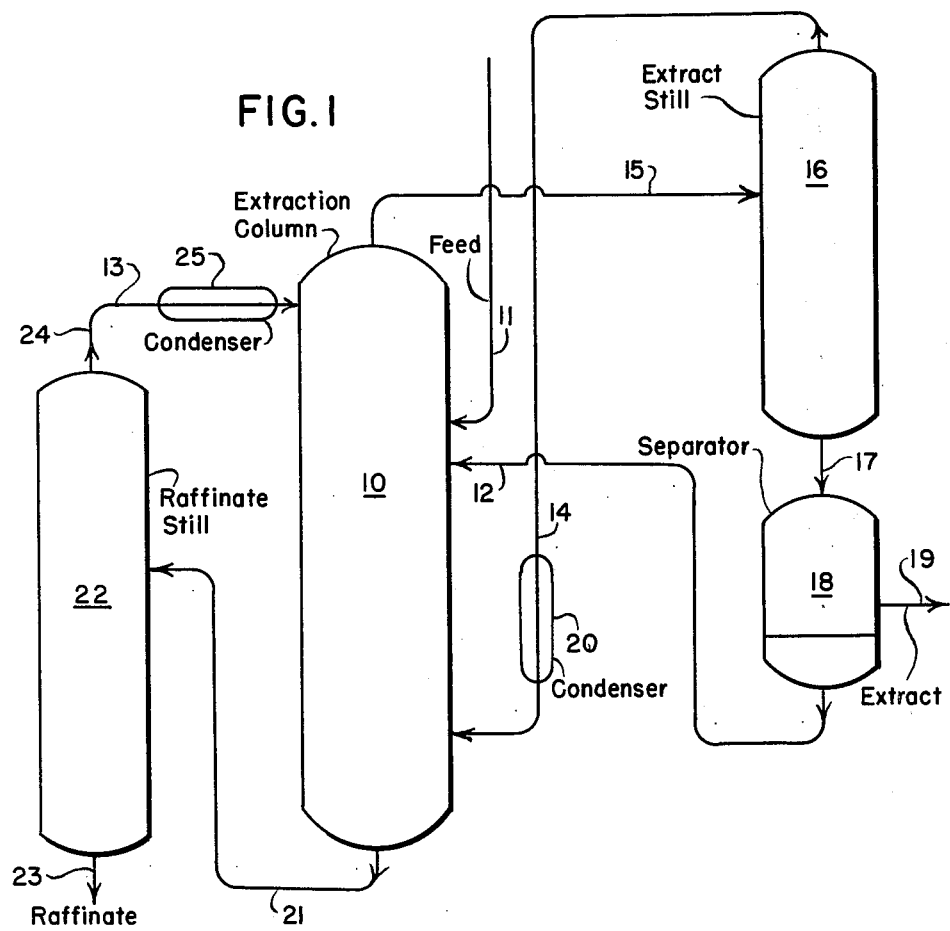
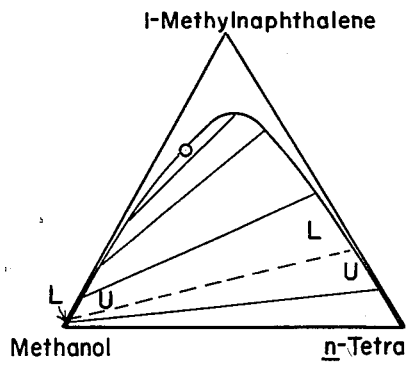
FIG. 2
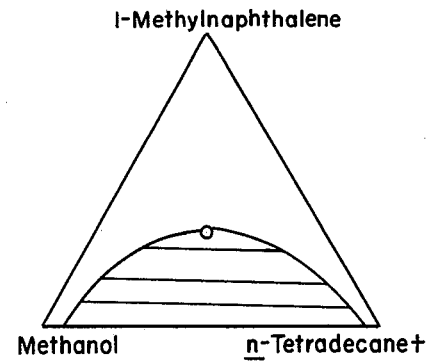
FIG. 3
INVENTOR.
Alfred W. Francis
BY
Charles A. Huggett
ATTORNEY June 4, 1963  A. W. FRANCIS  3,092,570
REMOVAL OF AROMATIC HYDROCARBONS FROM JET FUEL MIXTURES
Filed Aug. 1, 1960  3 Sheets-Sheet 2

INVENTOR.
Alfred W. Francis
BY
Charles A. Huggett
ATTORNEY

June 4, 1963 A. W. FRANCIS 3,092,570
REMOVAL OF AROMATIC HYDROCARBONS FROM JET FUEL MIXTURES
Filed Aug. 1, 1960 3 Sheets-Sheet 3

INVENTOR.
Alfred W. Francis
BY
Charles A. Huggett
ATTORNEY

United States Patent Office 3,092,570
Patented June 4, 1963

3,092,570
REMOVAL OF AROMATIC HYDROCARBONS
FROM JET FUEL MIXTURES
Alfred W. Francis, Woodbury, N.J., assignor to Socony
Mobil Oil Company, Inc., a corporation of New York
Filed Aug. 1, 1960, Ser. No. 46,478
6 Claims. (Cl. 208—323)

This invention relates to the improvement of hydrocarbon mixtures such as jet fuel mixtures comprising aromatic and nonaromatic hydrocarbons boiling at substantially the same boiling point by selective solvent extraction of the quality damaging aromatic hydrocarbons.

The need for obtaining quite pure streams of aromatic hydrocarbons has long been recognized in petroleum refining. These aromatic hydrocarbons are useful intermediates in the manufacture of petroleum chemicals as well as products in other branches of chemistry. The pure aromatic hydrocarbons are sold in quantity as solvents and make useful blending stocks in the manufacture of automotive fuel. Many of the most desired aromatic hydrocarbons are found in conjunction with nonaromatic hydrocarbons which boil at substantially the same boiling point. The separation of the aromatic hydrocarbon from the similarly boiling nonaromatic hydrocarbon is expensive. For example, benzene is generally found in association with heptanes, some of which compounds boil at substantially similar boiling points. The benzene is an excellent component for motor fuel having an octane rating substantially over 100 but n-heptane has an octane rating of zero. Some other heptanes also have low ratings.

The need for aromatics in reasonably pure state to provide improved automotive fuel for high compression engines is becoming more urgent with each improvement in automotive engine design. There is a growing need, however, for relatively pure paraffin hydrocarbons or at least hydrocarbon fuels from which aromatic hydrocarbons have been removed. This has been brought about in part by the recent refinements in turbine or jet engine designs. The aviation turbine engine has reached the point of development where small differences in fuel combustion quality have a significant effect on engine performance. Fuels with high combustion quality can provide a significant increase in engine life between major overhauls, reduce exhaust smoke on takeoff, increase combustion efficiency and allowable power output. The combustion quality of aviation turbine engine fuels can be ranked as follows: normal paraffin, isoparaffins, olefins, cycloparaffins and aromatics. As can be seen, the normal paraffins are most desired and particularly free of aromatics, the least desired component. Fuels presently being considered for commercial application in aircraft turbine engines are a mixture of normal and isoparaffins with the aromatic hydrocarbons substantially completely removed. It is contemplated as within the scope of this invention to provide such fuels by a continuous process as claimed in the attached claims.

It is known in the prior art that certain solvents are selective in separating aromatic hydrocarbons from a mixture of aromatic and nonaromatic hydrocarbons. Some of these solvents are miscible with the aromatic hydrocarbons and have a moderate solvent power for the nonaromatics, i.e., the binodal curves in ternary systems are comparatively low.

Unfortunately, those solvents possessing high solvent power for aromatics are expensive or result in extraction processes which are expensive. The aromatics could be removed by treatment with sulfuric acid or by adsorption in silica gel but these processes are also unsatisfactory considering the large volume of material to be treated in relation to the small proportion of aromatic hydrocarbons to be removed.

A solvent which has received very little consideration in the prior art for the removal of aromatics from a mixture of aromatic and nonaromatic hydrocarbons by solvent extraction is methanol. Methanol has a very low solvent power for hydrocarbon mixtures which are low in aromatics, low selectivity as these solvents are usually applied, and low density, close to the density of the hydrocarbons being treated. For these reasons, methanol would not be considered a suitable selective solvent for extracting minor amounts of aromatics from mixtures of aromatic and nonaromatic hydrocarbons. On the other hand, methanol is very low in cost, it is very stable and has a convenient boiling point (64.65° C.) for separations involving solvent recovery.

I have found that methanol can be used as an extractive solvent for the removal of aromatic hydrocarbons from mixtures of hydrocarbons containing both aromatic and paraffin hydrocarbons, among other types, useful as jet fuels provided the methanol is used in conjunction with carbon disulfide as a cosolvent. The carbon disulfide is added to the hydrocarbon mixture up to about 30% of the hydrocarbon. While carbon tetrachloride can be used as an alternate cosolvent, the results are not nearly as satisfactory and hence the carbon disulfide is the preferred cosolvent. Carbon tetrachloride has a less favorable distribution and hence larger amounts of cosolvent are required in spite of its higher density. Carbon disulfide is low in cost, has a satisfactorily high density and distributes itself mostly in the hydrocarbon layer so that the methanol layer becomes the upper layer regardless of the content of aromatic hydrocarbons carried in the methanol layer. Carbon disulfide is not completely miscible with pure methanol at ordinary temperature.

The isopycnic of methanol and hydrocarbon mixtures might be avoided also by diluting the latter with a light hydrocarbon-like hexane or pentane which also dilute the oil in preference to the methanol. The flow sheet would be modified since the extract would then be heavier. Such a combination is effective also in improving selectivity. The requisite of such a diluent is that it differs considerably in density from methanol (higher or lower), and that it dissolves very selectively in the hydrocarbon layer in preference to the methanol layer. However, such a solvent would have to be used in relatively larger quantity because the density difference is much less than in the case of the carbon disulfide. This is illustrated in Table I which shows densities of the various suggested solvents as follows:

Table I

| Liquid | Density | Boiling Point, ° C. | Azeotropic Boiling Point with Methanol, ° C. |
|---|---|---|---|
| Methanol | .793 | 64.5 | |
| Jet Fuels | 0.8 | 190–350 | |
| Lube Oils | 0.9 | | |
| Carbon Disulfide | 1.260 | 46.3 | 37.6 |
| N-Hexane | .660 | 68.74 | 50.0 |
| N-Pentane | .626 | 36.1 | 30.6 |
| Ethylene Glycol | 1.115 | 198 | |
| Carbon Tetrachloride | 1.595 | 76.8 | 55.7 |

It is seen from this Table I that the difference in density of hexane and methanol, 0.133 is much less than that of carbon disulfide and methanol, 0.467, so that it would require about three times as much of hexane as it does carbon disulfide to eliminate risk of isopycnics (formation of two immiscible layers having equal densities).

I have found that mixtures of hydrocarbon fuels, useful for combustion as jet fuels, and containing small amounts of aromatic hydrocarbons, can be improved in quality by introducing the fuel mixture into an extraction column at an intermediate point, introducing carbon disulfide near the top of the column and methanol near the bottom of the column to remove the aromatic hydrocarbons with the extract, largely methanol, and to remove the balance of the hydrocarbons with the raffinate, including the carbon disulfide. The carbon disulfide is removed in a raffinate still and recycled to the extraction column, leaving a vastly improved jet fuel of greatly improved performance characteristics. The methanol is removed in an extract still and recycled to the extraction column, leaving the extract aromatics.

The object of this invention is to provide a process for separating aromatic hydrocarbons from nonaromatic hydrocarbons boiling at substantially the same temperature.

A further object of this invention is to provide a process which permits the use of economical solvent materials for the continuous removal of small proportions of aromatic hydrocarbons from large volumes of mixed aromatic and non-aromatic hydrocarbons.

A further object of this invention is to provide a process which effects a substantial improvement in hydrocarbon jet fuels by removing quality damaging aromatic hydrocarbons from the jet fuels by solvent action of a mixture of economical solvents.

These and other objects of the invention will be more fully explained in the following detailed discussion of the invention which is to be read in conjunction with the attached figures.

FIGURE 1 shows a diagrammatic arrangement of vessels for separating aromatic hydrocarbons from non-aromatic hydrocarbons in accordance with this invention.

FIGURE 2 shows a ternary equilibrium diagram for 1-methylnaphthalene and n-tetradecane using methanol alone.

FIGURE 3 shows a ternary equilibrium diagram for 1-methylnaphthalene and n-tetradecane combined with 20% by weight of carbon disulfide using methanol at room temperature.

Figure 4:
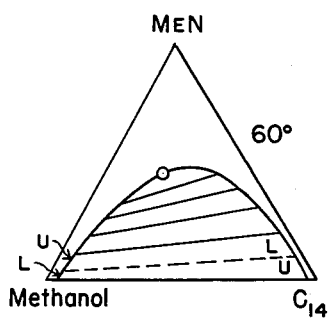
FIGURE 4 shows a ternary equilibrium diagram for 1-methylnaphthalene and n-tetradecane using methanol alone at 60° C.

Referring now to FIGURE 1, a selected feed of mixed hydrocarbons suitable for use as a jet fuel and containing a small proportion of aromatic hydrocarbons is introduced into the extraction column 10 at an intermediate level through the feed conduit 11. Water in small amounts is introduced into the column at a level below the feed conduit 11 through the conduit 12. Carbon disulfide is introduced into the column 10 through the conduit 13 at a level near the top of the column 10. Methanol is introduced into the column 10 through the conduit 14 at a level near the bottom of the column 10.

The extract is taken overhead through the conduit 15 to an extract still 16. The extract is predominately methanol with small amounts of carbon disulfide and aromatic hydrocarbons. The aromatic hydrocarbons passed overhead in the solvent may contain some nonaromatic hydrocarbons but this is of little consequence in this process since the primary object is to obtain an improved jet fuel substantially free of aromatics. Only a small quantity of water is used, such as 1–10% by weight based on the methanol used, with optimum limit of 2–3% by weight. It is to be noted that the extract phase is scrubbed with carbon disulfide in the upper part of the extraction column to return paraffins dissolved in the methanol. However, since the presence of a moderate amount of aromatic hydrocarbons in the methanol would make it miscible with carbon disulfide, the water is added to prevent the methanol from dissolving in the carbon disulfide.

Other diluents of the methanol than water may be used to prevent complete mixing with the carbon disulfide in the presence of aromatic hydrocarbons. Ethylene glycol is a preferred alternate for this purpose. It should be used in somewhat larger amounts than water, such as 5 to 10% by weight. The requisite for such a diluent is that it must mix with methanol and be almost immiscible with hydrocarbons, and have a boiling point substantially higher than methanol. Glycerol and propylene glycol would be operative; but di- and tri-ethylene glycols are too miscible with hydrocarbons.

Almost absolute methanol is preferred in the lower portion of the extraction column. The water diluent is carried over with the methanol and aromatics and is removed from the bottom of the extract still 16 through the conduit 17 to a separator 18. In the separator 18 the water settles to the bottom and is recycled through the conduit 12 to the extraction column 10. The aromatics with other incidental constituents are withdrawn from the upper layer through the conduit 19. The methanol is vaporized in the still 16 and returned to the bottom of the extraction column through the conduit 14 as nearly anhydrous as desired, depending upon the efficiency of the still. The methanol vapors are condensed in the condenser 20 before introduction into the column 10.

The hydrocarbons substantially stripped of aromatics and the carbon disulfide are taken from the bottom of the column 10 through the conduit 21 and introduced into the raffinate still 22 at an intermediate level. The purified jet fuel is withdrawn from the bottom of the raffinate still 22 through the conduit 23. The carbon disulfide and other minor constituents are taken overhead from the raffinate still 22 through the conduit 24 and returned to the top or upper portion of the column 10. The carbon disulfide is condensed in the condenser 25 before being returned to the extraction column 10.

Referring to FIGURE 2, which shows the ternary system, methanol-1-methylnaphthalene-n-tetradecane, the two hydrocarbons shown illustrate a typical polycyclic aromatic and a typical paraffin hydrocarbon of nearly equal boiling point. The use of ternary diagrams to express graphically the conditions occurring when three liquids are mixed is disclosed in "Textbook of Physical Chemistry," by Samuel Glasstone, starting at page 782. The ternary diagram of FIGURE 2 shows that with moderate concentrations of aromatics in this system the methanol layer contains less than 2% total hydrocarbon. It also shows that little of this is aromatics, as indicated by the slopes of the tie lines, which are low at the left. Furthermore, the dashed line is an isopycnic or tie line connecting compositions of equal density. The letters U and L indicate that at lower aromatic concentrations the methanol layer is the lower one. At higher concentrations the methanol layer is the upper one. If extractions were attempted in this system, the counter current flow of liquids would stall because of this reversal in relative density.

In contrast, FIGURE 3 shows the system methanol-1-methylnaphthalene-n-tetradecane containing about 20% by weight carbon disulfide. Although this is a quaternary system, it has been plotted on FIGURE 3 as a ternary system for illustrative and comparative purposes because most of the carbon disulfide remains in the n-tetradecane. It is seen that the binodal curve is much lower than shown on FIGURE 2, indicating by its departure from the left side line a much higher concentration of hydrocarbon in the upper methanol layer. The tie lines are nearly horizontal, indicating a favorable extraction of aromatic hydrocarbons. Furthermore, there is no isopycnic, so that there is no danger of reversal of density. The relative amount of methanol used depends on the amount of aromatic to be removed. Ordinarily, this will be at least equal to the amount of aromatic to be removed and preferably at least 50% greater.

Referring to FIGURE 4 which shows the ternary system methanol-1-methylnaphthalene-n-tetradecane at 60° isopycnic line is shown dashed. The isopycnic line connects compositions of equal density in equilibrium. The letters U and L on this diagram indicate the upper and lower layers, respectively.

Figure 5:
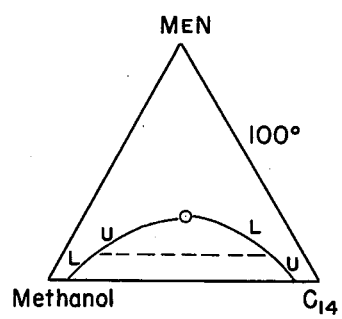
FIGURE 5 shows a ternary equilibrium diagram for 1-methylnaphthalene and n-tetradecane using methanol alone at 100° C.
Figure 6:
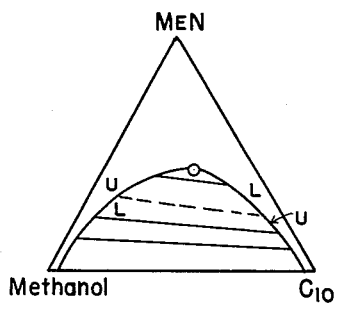
FIGURE 6 shows a ternary equilibrium diagram for 1-methylnaphthalene and n-decane using methanol alone.
Figure 7:
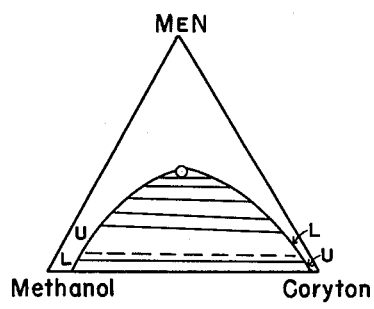
FIGURE 7 shows a ternary equilibrium diagram for 1-methylnaphthalene and Coryton oil using methanol alone.

It is seen that with very low concentrations of aromatics the methanol layer is the lower layer, but with a somewhat higher concentration the heavier aromatic hydrocarbon has increased the density of the hydrocarbon layer enough to make that one the lower. It is observed therefore that at some point in the process there would be reversals of the two layers. This same effect is illustrated in the example of FIGURE 2 and also present in the example of FIGURE 5. The examples of FIGURES 4 and 5 are the same as the example of FIGURE 2 but showing the effect of increasing temperature. It is seen that raising the temperature in FIGURES 4 and 5 is ineffective in eliminating the isopycnic. The curve in FIGURES 4 and 5 is lowered because of increased miscibility but the isopycnic remains. Referring to FIGURES 6, 7, 9, 11, 13, 14 and 15, a similar situation prevails and the isopycnic lines have been shown dashed on these diagrams.

Figure 8:
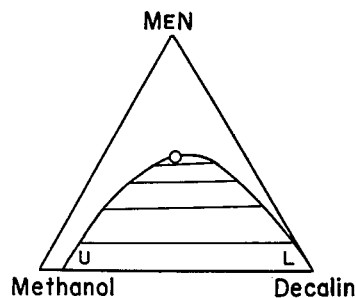
FIGURE 8 shows a ternary equilibrium diagram for 1-methylnaphthalene and decalin using methanol alone.
Figure 9:
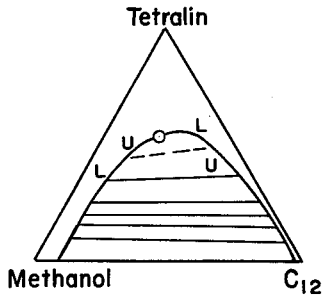
FIGURE 9 shows a ternary equilibrium diagram for tetralin and n-dodecane using methanol alone.
Figure 10:
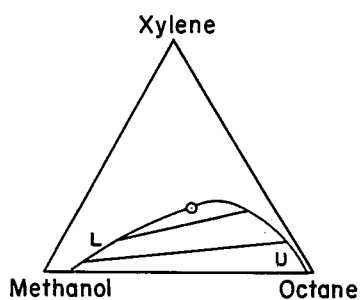
FIGURE 10 shows a ternary equilibrium diagram for xylene and n-octane using methanol alone.
Figure 11:
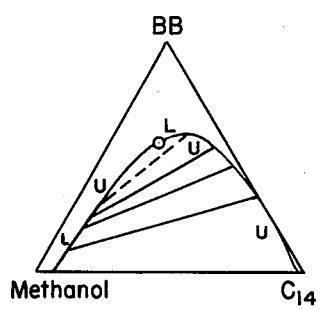
FIGURE 11 shows a ternary equilibrium diagram for sec-butylbenzene and n-tetradecane using methanol alone.
Figure 12:
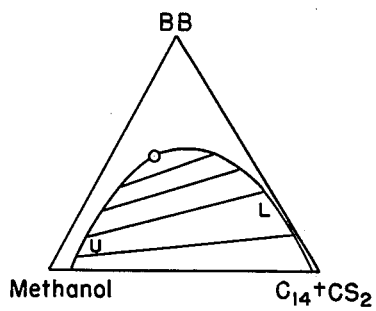
FIGURE 12 shows a ternary equilibrium diagram for sec-butylbenzene and n-tetradecane combined with 20% by weight of carbon disulphide and using methanol.
Figure 13:
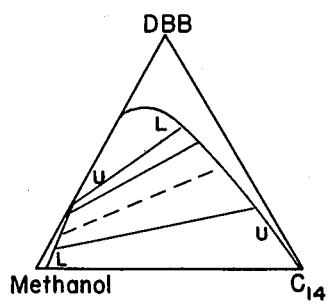
FIGURE 13 shows a ternary equilibrium diagram for di-sec-butylbenzene and n-tetradecane using methanol alone.
Figure 14:
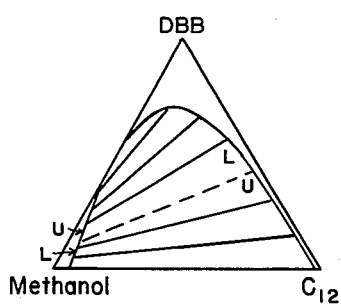
FIGURE 14 shows a ternary equilibrium for di-sec-butylbenezene and n-dodecane using methanol alone.
Figure 15:
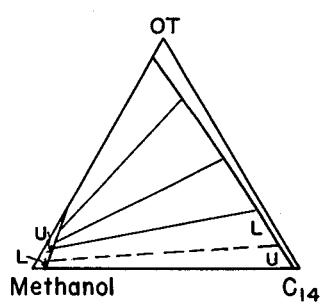
FIGURE 15 shows a ternary equilibrium diagram for octyltoluene and n-tetradecane using methanol alone.

Referring to FIGURES 8 and 10 the systems there illustrated do not have isopycnics. In the system shown on FIGURE 8 the decalin is heavier than the methanol and so it remains the lower layer throughout. In the system shown at FIGURE 10 the octane is so much lighter than the methanol that it remains the upper layer throughout. In these two systems, however, the densities are so close that settling is slow. In order to improve settling therefore the addition of carbon disulfide in FIGURE 8 and of hexane in FIGURE 10 would be advantageous, even though there is no isopycnic to be eliminated.

The Coryton oil was a selected hydrocarbon distillate oil having a gravity of 46.2 API and a boiling range of about 300 to 500° F. Detailed specifications of this oil are presented in Table II which follows:

*Table II*

[Gravity 46.2 API or 0.795 density]

| ASTM: | | |
|---|---|---|
| I.B.P. | °F__ | 335 |
| 5% | °F__ | 358 |
| 10% | °F__ | 365 |
| 50% | °F__ | 404 |
| 90% | °F__ | 466 |
| E.P. | °F__ | 500 |
| Hydrogen, wt. percent | | 13.98 |
| Aniline pt. | °F__ | 142.8 |
| Diesel index | | 66 |

*Table II—Continued*

| ASTM: | | |
|---|---|---|
| Aromatics | percent by vol__ | 18 |
| Smoke pt. | mm__ | 24.5 |
| Luminosity No. | | 63 |
| Color, Saybolt | | 21 |
| Sulfur | percent__ | 0.33 |
| Total mercaptan sulfur | p.p.m__ | 99 |
| IP freeze pt. | °F__ | −46 |
| ASTM freeze pt. | °F__ | −59 |
| Wick char | mg./kg__ | 79 |
| Heat of combustion: | | |
| B.t.u./lb. | | 18,625 |
| B.t.u./gal. | | 123,485 |
| $n_D^{20}$ | | 1.4400 |

The invention has been illustrated above to provide an understanding thereof. The illustration of the invention is not intended to limit the scope of the invention. The only limitations intended are found in the attached claims.

I claim:

1. A process for removing aromatic hydrocarbons from nonaromatic hydrocarbons boiling at substantially the same temperature which comprises introducing a hydrocarbon charge containing a mixture of aromatic and nonaromatic hydrocarbons into an extraction zone at an intermediate level of said zone, introducting at least a substantial amount of carbon disulfide up to about 30% by weight of the hydrocarbon charge into the extraction zone near the top thereof, introducing methanol into the extraction zone near the bottom thereof in an amount at least equal to the amount of aromatics in the hydrocarbon charge, introducing a limited amount of about 1–10% by weight based on the methanol used of a material selected from the group consisting of water, ethylene glycol, glycerol and propylene glycol into the extraction zone at a level below but not substantially below the level at which the hydrocarbon charge is introduced into said extraction zone, taking the methanol, aromatic hydrocarbons and material selected from the group consisting of water, ethylene glycol, glycerol and propylene glycol overhead from said extraction zone to an extract distillation zone, removing substantially pure methanol vapor from the top of said extract distillation zone, condensing said methanol vapor and introducing the liquid methanol into the lower portion of said extraction zone, withdrawing the aromatic hydrocarbons and the material selected from the group consisting of water, ethylene glycol, glycerol and propylene glycol from the bottom of said extract distillation zone to a separation zone, withdrawing said material selected from the group consisting of water, ethylene glycol, glycerol and propylene glycol from the bottom of said separation zone and returning said material to the extraction zone, withdrawing aromatic hydrocarbons from the upper portion of said separation zone, taking the carbon disulfide and nonaromatic hydrocarbons from the bottom of said extraction zone to a raffinate distillation zone, removing substantially pure carbon disulfide vapor from the top of said raffinate distillation zone, condensing said carbon disulfide vapor and introducing the liquid carbon disulfide into the upper portion of said extraction zone, and withdrawing the nonaromatic hydrocarbons from the bottom of said raffinate distillation zone, substantially free of undesirable aromatic hydrocarbons.

2. A process for removing aromatic hydrocarbons from nonaromatic hydrocarbons boiling at substantially the same temperature which comprises introducing a hydrocarbon charge containing a mixture of aromatic and nonaromatic hydrocarbons into an extraction zone at an intermediate level of said zone, introducing at least a substantial amount of carbon disulfide up to about 30% by weight of the hydrocarbon charge into the extraction zone near the top thereof, introducing methanol into the extraction zone near the bottom thereof in an amount at least equal to the amount of aromatics in the hydrocarbon charge, introducing a limited amount of about 1-10% by weight based on the methanol used of water into the extraction zone at a level below but not substantially below the level at which the hydrocarbon charge is introduced into said extraction zone, taking the methanol, aromatic hydrocarbons and water overhead from said extraction zone to an extract distillation zone, removing substantially pure methanol vapor from the top of said extract distillation zone, condensing said methanol vapor and introducing the liquid methanol into the lower portion of said extraction zone, withdrawing the aromatic hydrocarbons and water from the bottom of said extract distillation zone to a separation zone, withdrawing water from the bottom of said separation zone and returning said water to the extraction zone, withdrawing aromatic hydrocarbons from the upper portion of said separation zone, taking the carbon disulfide and nonaromatic hydrocarbons from the bottom of said extraction zone to a raffinate distillation zone, removing substantially pure carbon disulfide vapor from the top of said raffinate distillation zone, condensing said carbon disulfide vapor and introducing the liquid carbon disulfide into the upper portion of said extraction zone, and withdrawing the nonaromatic hydrocarbons from the bottom of said raffinate distillation zone, substantially free of undesirable aromatic hydrocarbons.

3. A process for removing aromatic hydrocarbons from nonaromatic hydrocarbons boiling at substantially the same temperature which comprises introducing a hydrocarbon charge containing a mixture of aromatic and nonaromatic hydrocarbons into an extraction zone at an intermediate level of said zone, introducing at least a substantial amount of carbon disulfide up to about 30% by weight of the hydrocarbon charge into the extraction zone near the top thereof, introducing methanol into the extraction zone near the bottom thereof in an amount at least equal to the amount of aromatics in the hydrocarbon charge, introducing a limited amount of about 1-10% by weight based on the methanol used of ethylene glycol into the extraction zone at a level below but not substantially below the level at which the hydrocarbon charge is introduced into said extraction zone, taking the methanol, aromatic hydrocarbons and ethylene glycol overhead from said extraction zone to an extract distillation zone, removing substantially pure methanol vapor from the top of said extract distillation zone, condensing said methanol vapor and introducing the liquid methanol into the lower portion of said extraction zone, withdrawing the aromatic hydrocarbons and ethylene glycol from the bottom of said extract distillation zone to a separation zone, withdrawing ethylene glycol from the bottom of said separation zone and returning said ethylene glycol to the extraction zone, withdrawing aromatic hydrocarbons from the upper portion of said separation zone, taking the carbon disulfide and nonaromatic hydrocarbons from the bottom of said extraction zone to a raffinate distillation zone, removing substantially pure carbon disulfide vapor from the top of said raffinate distillation zone, condensing said carbon disulfide vapor and introducing the liquid carbon disulfide into the upper portion of said extraction zone, and withdrawing the nonaromatic hydrocarbons from the bottom of said raffinate distillation zone, substantially free of undesirable aromatic hydrocarbons.

4. The process of claim 2 further characterized in that the water content is about 2-3% by weight of the methanol charged to the process.

5. The process of claim 3 further characterized in that the ethylene glycol content is about 5-10% by weight of the methanol charged to the process.

6. Claim 2 further characterized in that the hydrocarbon charge is a selected jet combustion fuel containing a minor proportion of aromatic hydrocarbons.

References Cited in the file of this patent

UNITED STATES PATENTS

| | | |
|---|---|---|
| 2,023,109 | Van Dijck | Dec. 3, 1935 |
| 2,407,820 | Durrum | Sept. 17, 1946 |
| 2,633,448 | Neuworth | Mar. 31, 1953 |